US011620693B2

(12) United States Patent
Yoo (10) Patent No.: US 11,620,693 B2
(45) Date of Patent: Apr. 4, 2023

(54) APPARATUS, SYSTEM AND METHOD FOR PROVIDING PRODUCT AND STORE SEARCH RESULTS ASSOCIATED WITH META SHOPPING MALL

(71) Applicant: NHN CLOUD CORPORATION, Gyeonggi-do (KR)

(72) Inventor: Eun bit Yoo, Gyeonggi-do (KR)

(73) Assignee: NHN CLOUD CORPORATION, Gyeonggi-Do (KR)

( * ) Notice: Subject to any disclaimer, the term of this patent is extended or adjusted under 35 U.S.C. 154(b) by 133 days.

(21) Appl. No.: 16/952,252

(22) Filed: Nov. 19, 2020

(65) Prior Publication Data

US 2021/0150605 A1    May 20, 2021

(30) Foreign Application Priority Data

Nov. 19, 2019    (KR) .......................... 10-2019-0148591

(51) Int. Cl.
| | |
|---|---|
| *G06Q 30/00* | (2023.01) |
| *G06Q 30/0601* | (2023.01) |
| *G06Q 10/087* | (2023.01) |
| *G06Q 10/10* | (2023.01) |
| *G06F 16/9538* | (2019.01) |
| *G06N 20/00* | (2019.01) |

(52) U.S. Cl.
CPC ..... *G06Q 30/0627* (2013.01); *G06F 16/9538* (2019.01); *G06N 20/00* (2019.01); *G06Q 10/087* (2013.01); *G06Q 10/10* (2013.01); *G06Q 30/0629* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 7,917,493 B2 * | 3/2011 | Vailaya | G06F 16/334 707/711 |
| 11,301,540 B1 * | 4/2022 | Boteanu | G06F 40/30 |
| 2013/0275466 A1 * | 10/2013 | Xiao | G06F 16/90335 707/769 |

FOREIGN PATENT DOCUMENTS

KR    10-2019-0094656    8/2019

* cited by examiner

*Primary Examiner* — Mila Airapetian
(74) *Attorney, Agent, or Firm* — Ladas & Parry, LLP (57) ABSTRACT

A method for providing a product search result of a meta shopping mall comprises constructing a database by receiving store information and product information from servers for stores; receiving the store information and the product information from the stores, generating a store index document and a product index document including search words, and storing the store index document and the product index document on the database; generating keyword comprehensive information about a store which has registered a keyword, generating a keyword index document matching the keyword to the store which has registered the keyword, and storing the keyword index document on the database; receiving a search word input from a user; and searching the keyword index document within the database for the search word and providing the user with a store search result output interface for a product corresponding to the keyword.

14 Claims, 6 Drawing Sheets

APPARATUS, SYSTEM AND METHOD FOR PROVIDING PRODUCT AND STORE SEARCH RESULTS ASSOCIATED WITH META SHOPPING MALL

CROSS REFERENCE TO RELATED APPLICATION

This application claims priority from and benefits of Korean Patent Application No. 10-2019-0148591, filed on Nov. 19, 2019, which are hereby incorporated by reference for all purposes as if fully set forth herein.

BACKGROUND OF THE DISCLOSURE

Technical Field

The present disclosure generally relates to a method, apparatus and system for providing a product search result of a meta shopping mall. More specifically, the present disclosure relates to a method, apparatus and system for providing search results associated with products in a meta shopping mall providing integrated shopping services in association with a plurality of online stores.

Related Art

Recently, with an increase of the number of people shopping online and through mobile, an online mall in the form of a meta service that connects shoppers who want to buy inexpensive products to an online shopping mall selling them, that is, a meta shopping mall, is emerging.

While existing online shopping malls are good at improving customer satisfaction through various discount benefits and quick delivery, the meta shopping mall provides a shopping meta service that allows a shopper to compare information (e.g. prices) of products provided by a plurality of online shopping malls and to check the price comparison results all at once though an user interface.

Conventionally, consumers who try to find a desired product from an conventional meta shopping mall have to input a search word related to their desired product to a search service interface or screen, and the conventional meta shopping mall retrieves a couple of webpages including the corresponding search word and displays a list of titles of the webpages.

Afterwards, if the consumer finds a webpage considered to be related to the desired product from the search results displayed through the meta shopping mall, the consumer may move to that webpage through a simple operation such as clicking on the displayed portion.

However, the conventional meta shopping mall service has a limit in that it provides information only from a search result based on primitive data such as the name of an online shopping mall or basic information included in the product information.

Also, there is a problem that a search result screen (for example, a search result in order of registration, purchase rate, or product name (alphabetical order)) commonly provided by conventional meta shopping mall services is not suitable for recognizing a vast amount of product search results in a systematic manner.

Accordingly, some exemplary embodiments of the present disclosure develop new technologies which may include a new paradigm and a new process for generating profits through operation of meta shopping malls and providing new services.

REFERENCES

Patents (Patent 1) Korean Patent Application Publication No. 10-2019-0094656 A

SUMMARY OF THE DISCLOSURE

The present disclosure, which has been made in an effort to solve the problems described above, is intended to provide an interface through which a product search can be performed in various ways, and a search result may be provided in a systematic manner based on a multi-faceted process in a meta shopping mall providing integrated shopping services coupled to a plurality of online stores.

Also, an object of some embodiments of the present disclosure is to provide a meta shopping mall that increases profits generated through meta shopping mall services and maximizes the exposure effect of stores (e.g. online shopping mall) and/or products provided through the meta shopping mall.

In a method for providing a product search result of a meta shopping mall providing, by a processor of the meta shopping mall server, information on a plurality of stores registered on the meta shopping mall and products of the plurality of stores, the method for providing a product search result of a meta shopping mall according to an embodiment of the present disclosure comprises constructing a database by receiving store information and product information from a server for the plurality of stores; receiving store information from the plurality of registered stores, generating a store index document including search words for searching for each of the plurality of stores, and storing the generated index document into the database; receiving in-store product information from the plurality of registered stores, generating a product index document including search words for searching for each of the plurality of in-store products, and storing the generated product index document into the database; if at least part of the plurality of registered stores registers a keyword, generating keyword comprehensive information about a store which has registered the keyword, generating a keyword index document matching the keyword to the store which has registered the keyword, and storing the generated keyword index document into the database; receiving a search word input from a user; and searching the keyword index document within the database for the received search word and providing a store search result output interface for a product corresponding to the keyword.

At this time, the method for providing a product search result of a meta shopping mall according to an embodiment of the present disclosure further comprises searching the product index document for the received search word and searching for a product matching the search word; and if at least one or more products are searched, providing a product search result output interface for the searched products to the user.

Also, the method further comprises searching the store index document for the received search word and searching for a store matching the search word; and if at least one or more stores are searched, providing a store search result output interface for the searched stores to the user.

Also, the providing a store search result output interface for a product corresponding to the keyword includes, if a store is not searched from the store index document, searching the keyword index document for the received search word and searching for a store matching the search word; and providing a store search result output interface for a product within a store corresponding to the keyword searched from the keyword comprehensive information in terms of the keyword.

Also, the store information includes a store name of the store and a store homepage link address; and the product information includes a product name, a product sales store name, a product page link address, a product tag word, a product price, a product image for the product sold in the store, and at least one or more of product description, product sales volume, and product review information for the product.

Also, the keyword comprehensive information includes at least one or more of a keyword name, keyword registration information for each store, penalty information for each store, information on a keyword expiration date for each store, and keyword product information for each store.

Also, the generating keyword comprehensive information further comprises obtaining the keyword product information by performing deep learning based on product images of product information about the respective products sold in the store.

Also, the generating keyword comprehensive information further comprises comparing the keyword with a designated tag word obtained by performing deep learning based on the product images and if at least part of the designated tag word matches the keyword, including the product information matching the designated tag word in the keyword product information.

Also, the providing a store search result output interface to the user includes extracting the store information corresponding to the search word based on the store index document and returning a store link list based on the extracted store information; and the providing a store search result output interface for an in-store product corresponding to the keyword searched from the keyword comprehensive information includes extracting the store corresponding to the search word based on the keyword index document, extracting keyword product information matching the keyword among the extracted in-store products, and returning the store link list and the product link list by generating and grouping the store link list and the product link list based on the extracted keyword product information.

Also, the store link list includes the store name for the store and the store homepage link address that leads to the homepage of the store on the web; and the product link list includes the product name of the product, the product sales store name, the product page link address that leads to a webpage containing detailed information of the product, the product price, and the product image.

Also, the returning the store link list and the product link list by generating and grouping the store link list and the product link list includes imposing a predetermined penalty on the store in the absence of the product link list.

Also, the store search result output interface is an interface displaying in a batch fashion at least one or more of the store link lists detected based on the search word as a graphic image, and the product search result output interface is an interface displaying in a batch fashion at least one or more of the product link lists detected based on the search word as a graphic image.

Also, the providing the search result through a search result interface includes providing the search result on a screen of a user terminal displaying the search result interface such that the store search result output interface is configured to be placed above the product search result output interface.

Also, a method for providing a product search result of a meta shopping mall according to an embodiment of the present disclosure, the method providing a product search result of a meta shopping mall being accessed by a controller of a user terminal and providing information on a plurality of stores and products of the plurality of stores by the controller of the user terminal, comprises obtaining a search word input of the user through an input unit; transmitting the search word to the meta shopping mall server; receiving information on a product within the meta shopping mall matching the search word and controlling a display to display a search result output interface for the product on a first area; receiving information about a store registered on the meta shopping mall matching the search word and controlling the display to display a search result output interface for the store on a second area; and receiving information about a store registered on the meta shopping mall not matching the search word and information about a product matching the search word among products within the store and controlling the display to display, on the second area, a store search result output interface listing information about a product matching the search word according to categories within the store.

However, it should be noted that technical objects to be achieved by the present disclosure and embodiments of the present disclosure are not limited to the technical objects described above and other technical objects may also be addressed.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present disclosure and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Meanwhile, when descriptions are given with reference to the appended drawings, the same or corresponding constituting element is assigned the same reference number, and repeated descriptions thereof will be omitted.

Figure 1:
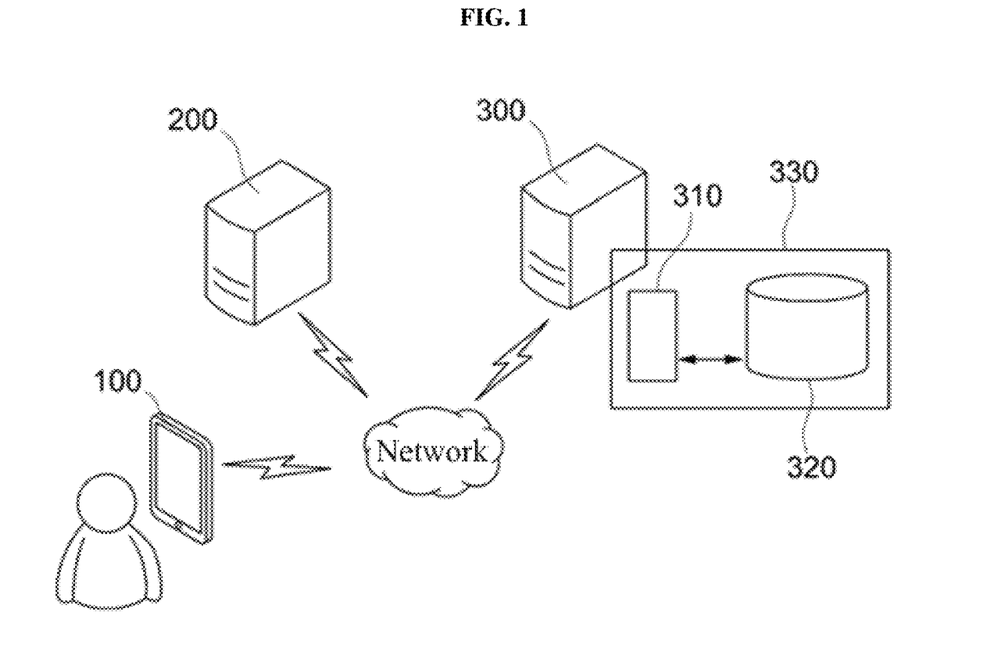
FIG. 1 illustrates a system providing a product search result of a meta shopping mall according to an embodiment of the present disclosure.

FIG. 1 schematically illustrates a system providing a product search result of a meta shopping mall according to an embodiment of the present disclosure.

Referring to FIG. 1, a system providing a product search result of a meta shopping mall according to an embodiment of the present disclosure may include a user terminal 100, a meta shopping mall server 200, and a store server 300.

As shown in FIG. 1, each constituting element of FIG. 1 may be connected to each other through a network. The network may refer to a connection structure that enables exchange of data, signals, and/or information between the respective nodes such as the user terminal 100, meta shopping mall server 200, and store server 300, where examples of the network include the 3rd Generation Partnership Project (3GPP) network, Long Term Evolution (LTE) network, World Interoperability for Microwave Access (WIMAX) network, Internet, Local Area Network (LAN), Wireless Local Area Network (Wireless LAN), Wide Area Network (WAN), Personal Area Network (PAN), Bluetooth network, satellite broadcast network, analog broadcast network, and Digital Multimedia Broadcasting (DMR), but the present disclosure is not limited to the specific examples.

User Terminal

First, the user terminal 100 according to an embodiment of the present disclosure may be, for example, but not limited to, a portable terminal in which a program for executing a product search result provision service of a meta shopping mall is installed. The portable terminal may include a smartphone, a digital broadcast terminal, a mobile phone, a Personal Digital Assistant (PDA), a Portable Multimedia Player (PMP), a navigation terminal, a tablet PC, a wearable device, and a smart glass.

Also, the user terminal 100 may further include a device in which a program for executing the product search result provision service of the meta shopping mall based on wired/wireless communication is installed. The device may include a fixed terminal or a terminal for use at a specific location such as a desktop PC and a personal computer such as a laptop computer and an ultrabook.

In an embodiment of the present disclosure, the user terminal 100 may provide an application providing a meta shopping mall service to a user and receive or detect various inputs of the user related to the meta shopping mall service.

Figure 2:
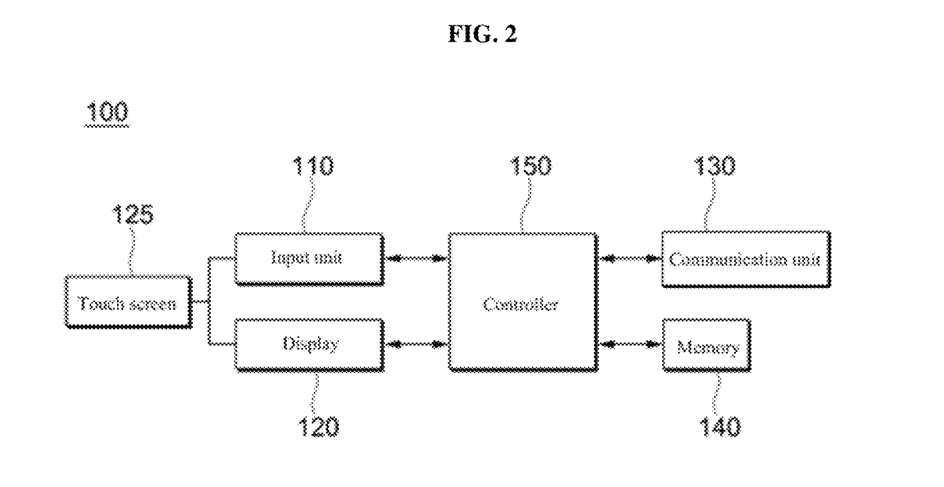
FIG. 2 illustrates an internal block diagram of a user terminal according to an embodiment of the present disclosure.

FIG. 2 illustrates an internal block diagram of a user terminal according to an embodiment of the present disclosure.

More specifically, referring to FIG. 2, the user terminal 100 according to an embodiment of the present disclosure may include an input unit 110, a display 120, a communication unit 130, a memory 140, and a controller 150.

First, the input unit 110 may be configured to receive or detect a user input such as a user input related to a product search result provision service of a meta shopping mall.

According to an embodiment, the input unit 110 may detect a user input related to search (such as a search word) and/or a selection input for a store or a product link.

Next, the display 120 may display various user interfaces and/or pieces of information related to a product search result provision service of a meta shopping mall as a graphic image.

For example, the display 120 may include at least one of Liquid Crystal Display (LCD), Thin Film Transistor-Liquid Crystal Display (TFT LCD), Organic Light-Emitting Diode (OLED), flexible display, 3D display, and e-ink display.

Alternatively, the input unit 110 and the display 120 may be combined to be implemented as a touch screen 125.

Next, the communication unit 130 may be configured to transmit and receive various types of data, signals and/or information for providing a product search result provision service of a meta shopping mall.

According to an embodiment, the communication unit 130 may transmit and receive various types of data related to a product search result provision service of a meta shopping mall by communicating with the meta shopping mall server 200 and/or the store server 300.

For instance, the communication unit 130 may transmit and receive a wireless signal to and from at least one of a base station, an external device, and an arbitrary server on a mobile communication network constructed according to technology standards or communication methods for mobile communication (for example, Global System for Mobile communication (GSM), Code Division Multi Access (CDMA), High Speed Downlink Packet Access (HSDPA), High Speed Uplink Packet Access (HSUPA), Long Term Evolution (LTE), Long Term Evolution-Advanced (LTE-A)).

Next, the memory 140 may be configured to store one or more of various application programs, data, and commands providing a product search result provision service of a meta shopping mall.

According to an embodiment, the memory 140 may store and manage applications providing a meta shopping mall service and/or search word logs.

For example, the memory 140 may be implemented by various types of storage devices such as ROM, RAM, EPROM, a flash drive, and a hard drive or by a web storage such as a cloud service server performing a storage function of the memory 140 on the Internet.

Lastly, the controller 150 may be configured to perform a series of data processing by controlling the elements described above to perform a product search result provision service of a meta shopping mall.

In order to perform the prescribed functions and desired processing, as well as the computations therefore, the controller 150 may be implemented by using at least one of, for example, but not limited to, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, and other electric units for performing a function.

Meta Shopping Mall Server

Meanwhile, a meta shopping mall server 200 according to an embodiment of the present disclosure may operate a series of processes for implementing a product search result provision service of a meta shopping mall.

More specifically, the meta shopping mall server 200 according to an embodiment may be configured to provide a meta shopping mall implementing an online shopping service integrating a plurality of stores (e.g. online shopping malls) in conjunction with a plurality of store servers 300.

Also, the meta shopping mall server 200 may construct a meta shopping mall database based on the information obtained from the user terminal 100 and/or the store server 300.

Also, the meta shopping mall server 200 may derive products that a user wants to search from a plurality of stores based on a search word obtained through the user terminal 100 and generate information about a search result and provide the generated information through a user interface. For example, the meta shopping mall server 200 receives the search word(s), which the user inputs to the user terminal (100), from the user terminal (100), performs search operation based on the search word(s) from the plurality of online shopping mall websites to search information (e.g. prices) of the products associated the search word(s) from the plurality of online shopping mall websites, and provide a user interface for providing the search result to the user terminal 100.

Also, the meta shopping mall server 200 may provide a store that has paid a predetermined price with a search preferential service corresponding to the paid amount. Detailed descriptions of the search preferential service will be given later.

Figure 3:
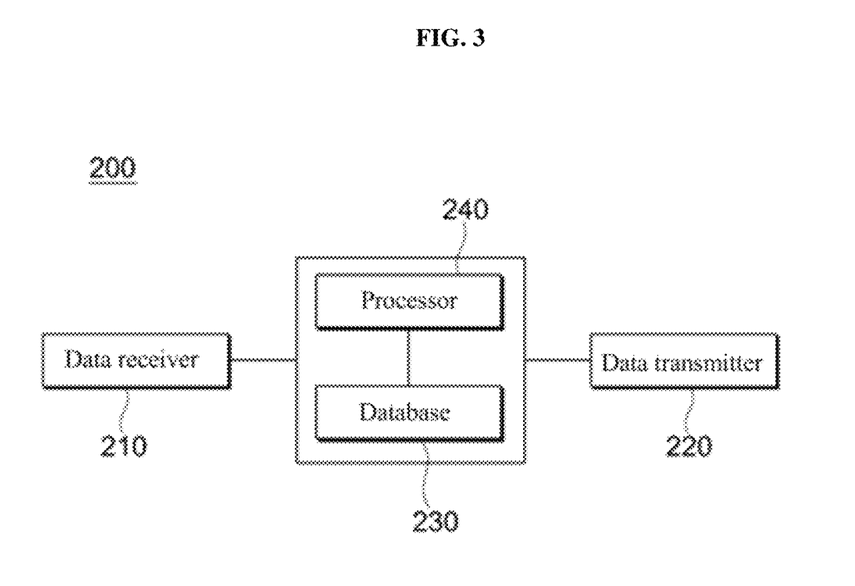
FIG. 3 illustrates an internal block diagram of a meta shopping mall server according to an embodiment of the present disclosure.

FIG. 3 illustrates an internal block diagram of a meta shopping mall server according to an embodiment of the present disclosure.

More specifically, referring to FIG. 3, a meta shopping mall server 200 according to an embodiment of the present disclosure may include a data receiver 210, a data transmitter 220, a database 230, and a processor 240.

First, the data receiver 210 may be configured to receive various types of data, information and signals for performing a product search result provision service of a meta shopping mall in conjunction with the user terminal 100, the store server 300 and/or an external server through the network.

According to an embodiment, the data receiver 210 may receive store information about each store and/or product information about products sold by each store from a plurality of store servers 300. Also, the data receiver 210 may receive information related to a keyword for performing a keyword-based search by communicating with an external server such as the store server 300.

Also, according to an embodiment, the data transmitter 220 may transmit various types of data, information and signals for performing the product search result provision service of the meta shopping mall in conjunction with the user terminal 100, the store server 300 and/or an external server through the network.

According to an embodiment, the data transmitter 220 may transmit a search result for a product to the user terminal 100 through a store search result output interface and/or a product search result output interface.

Next, the database 230 may store and manage various types of data related to a product search result provision service of a meta shopping mall.

According to an embodiment, the database 230 may store and manage store information, product information, keyword comprehensive information and/or a deep learning neural network operation program.

The database 230 may be implemented by various types of storage devices such as ROM, RAM, EPROM, a flash drive, and a hard drive or by a web storage performing a storage function of the database 230 on the Internet.

Lastly, the processor 240 may control the overall operation of each constituting element of the meta shopping mall server 200 described above to implement a product search result provision service of a meta shopping mall.

At this time, the processor 240 may be configured to perform image-based deep learning in conjunction with a deep learning neural network.

More specifically, the processor 240 according to an embodiment may perform deep learning for extracting, among a plurality of products provided by a store such as an online store and a webpage or application of the store, at least one or more products corresponding to a keyword that the store has registered.

Here, a deep learning neural network according to an embodiment may be installed or operated directly in the meta shopping mall server 200, or may receive images and perform deep learning as a separate device from the meta shopping mall server 200.

In what follows, an embodiment of the present disclosure is described under an assumption that a deep learning neural network is installed directly in the meta shopping mall server 200 and performs deep learning.

More specifically, the processor 240 may read a deep learning neural network operation program from the database 230 and perform the deep learning by using a deep learning neural network system built in the read operation program.

The processor 240 may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, and other electric units for performing a function.

Store Server

A store server 300 according to an embodiment of the present disclosure may provide various pieces of information, data and/or signals related to a store, which is an e-commerce online shopping mall at which one or more products or services may be ordered and sold through the network, to the user terminal 100 and/or meta shopping mall server 200.

According to an embodiment, the store server 300 may provide the meta shopping mall server 200 with store information about each store and product information about products provided by each store.

Referring further to FIG. 1, the store server 300 according to an embodiment of the present disclosure may include a data transceiver 310, a data storage unit 320, and a data processing unit 330.

Here, the data transceiver 310 may be configured to form a communication channel between an external device, such as the meta shopping mall server 200 and/or user terminal 100, and the store server 300, and through the communication channel, may perform a series of wired/wireless communication transmitting and receiving information required for implementing a product search result provision service of a meta shopping mall.

In an embodiment, the data transceiver 310 may transmit store information and/or product information of the corresponding store server 300 to the meta shopping mall server 200.

Also, the data storage unit 320 may store one or more of various application programs, data, and commands required for implementing a product search result provision service of a meta shopping mall.

In an embodiment, the data storage unit 320 may store and manage store information and/or product information of the corresponding store server 300.

Also, the data storage unit 320 may include a program area and a data area. The program area may be linked to an Operating System (OS) that boots up the store server 300 and functional elements, and the data area may store data generated according to the use of the store server 300.

The data storage unit 320 may be implemented by various types of storage devices such as ROM, RAM, EPROM, a flash drive, and a hard drive or by a web storage performing a storage function of the data storage unit 320 on the Internet.

Lastly, the data processing unit 330 may control and operate the overall operation of each unit of the store server 300 described above.

The data processing unit 330 may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, and any other electric units for performing functions or operations described above.

Method for Providing a Product Search Result of a Meta Shopping Mall

In what follows, a method for providing a product search result of a meta shopping mall according to an embodiment of the present disclosure will be described in detail with reference to appended drawings. In what follows, for the convenience of descriptions, the processor 240 of the meta shopping mall server 200 is referred to as the meta shopping mall server 200.

Figure 4:
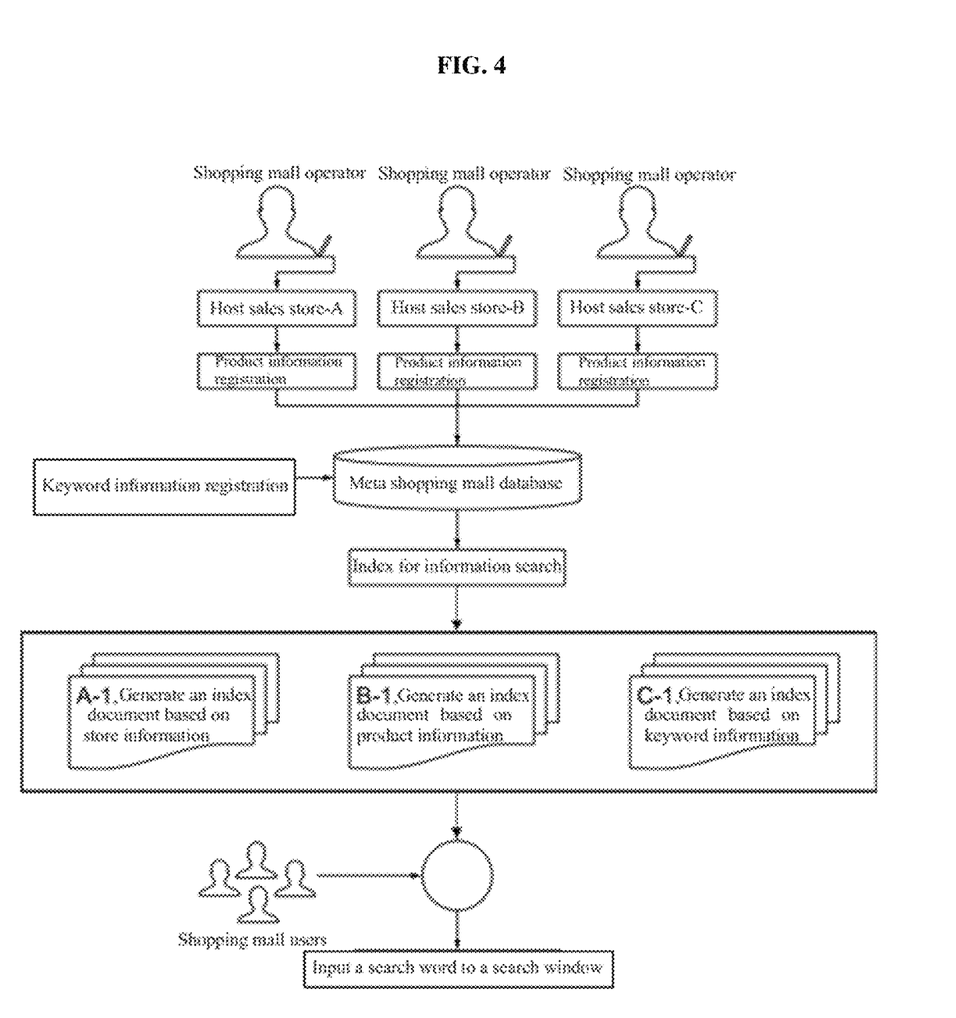
FIG. 4 illustrates a method for constructing a database of a meta shopping mall according to an embodiment of the present disclosure.

FIG. 4 illustrates a method for constructing a database 230 of a meta shopping mall according to an embodiment of the present disclosure.

Referring to FIG. 4, first, the meta shopping mall server 200 according to an embodiment of the present disclosure may construct a meta shopping mall database 230.

Here, a meta shopping mall according to an embodiment of the present disclosure may be an online brokerage shopping mall that provides one integrated shopping service in association with a plurality of online stores and may provide a service that shows products provided by a plurality of stores registered on the meta shopping mall and compares their products with each other in a comprehensive manner.

More specifically, the meta shopping mall server 200, in conjunction with each store server 300 of a plurality of stores (for example, store-a, store-b, and store-c), may register and store information about the plurality of stores on the database 230 of the meta shopping mall server 200. In other words, a store according to an embodiment of the present disclosure may be an online stopping mall registered and stored on the meta shopping mall server 200.

Also, the meta shopping mall server 200 may convert various pieces of information or data related to a registered store into a database format and store the converted information or data on the database 230.

In an embodiment, the meta shopping mall server 200 may store and manage store information and/or product information related to a registered store by matching the store and/or product information to a respective store.

At this time, the store information may include, for example, but not limited to, a store name, a store homepage link address, keyword registration information, keyword purchase information and/or penalty information about a store of the meta shopping mall, namely, a store registered on the meta shopping mall server 200.

In an embodiment below, registering a keyword is regarded as purchasing a keyword.

Here, the keyword purchase information may include a keyword name purchased by a specific store, an expiration date and/or payment information.

Also, the penalty information may be information about a disadvantage given to a store when the corresponding store fails to meet a predetermined criterion imposed on the meta shopping mall service. The penalty information will be described in detail later.

Meanwhile, the product information may include a product name, a product sales store name, a product page link address, a tag word set on the product, a product description, a product price, a product image, product sales volume and/or product review information for the product sold in a store of the meta shopping mall, namely, a store registered on the meta shopping mall server 200.

Here, the tag word may be a parameter for classifying a product into a predetermined category. For example, a tag word may be '#one-piece dress', '#jeans' and/or '#T-shirt'.

Also, the meta shopping mall server 200 according to an embodiment may obtain keyword comprehensive information and store and manage the obtained keyword comprehensive information on the database 230.

More specifically, the meta shopping mall server 200 may communicate with an external server such as the store server 300 and obtain the keyword comprehensive information for performing a keyword-based search by receiving the information from the store server 300.

At this time, a keyword may be a part of service products sold at a predetermined price for a store, and when a keyword is sold for a store at a predetermined price, the keyword is matched to the corresponding store and registered and stored on the database 230.

More specifically, the keyword may be generated to correspond to a tag word used as a parameter for classifying a product into a predetermined category and extracting a result of a meta shopping mall service-based product search, and may be composed so as to include at least one or more of a plurality of tag words. For example, the keyword may include 'one-piece dress', 'jeans', and 'T-shirts' corresponding to tag words such as '#one-piece dress', '#jeans', and '#T-shirts'.

Also, the keyword according to an embodiment may be used as a parameter used for detecting a store that has purchased the corresponding keyword and/or a product matching the corresponding store and the corresponding keyword. In other words, the keyword may be composed of a plurality of tag words and if a store purchases at least one of keywords, the store may receive a search service for the purchased keyword.

More specifically, if part of a keyword matches and corresponds to a search word entered by a user, a store that has purchased the corresponding keyword and/or a product matching the corresponding store and the corresponding keyword may be made to be searched or detected. Detailed descriptions of the operations described above will be given later.

Also, the keyword comprehensive information may include a keyword name, keyword purchase information for each store, penalty information for each store, keyword purchase expiration date information for each store and/or keyword product information for each store.

More specifically, first, the keyword name may be generated to correspond to each of a plurality of tag words, and a name of a generated keyword may be identical to a matched tag word.

Also, the keyword purchase expiration date information may be information indicating a predetermined period during which a keyword purchased by a store is matched to the corresponding store and stored to be used effectively at the time of a product search. For example, the keyword purchase expiration date information may be set to one month when a specific store purchases an one-month keyword subscription or one year in the case of one-year keyword subscription.

Also, the keyword product information according to an embodiment may be product information about one or more products, among products sold at a store, corresponding to a keyword that the store has purchased and may be stored on the database 230 being matched to the corresponding keyword and the corresponding store.

For example, when a first store has purchased a first keyword, keyword product information may be product information about one or more products determined to correspond to the first keyword among a plurality of products sold at the first store, which may be stored on the database 230 by being matched to the first store and the first keyword.

Returning to the description to give more details, to obtain the keyword comprehensive information and to store and manage the obtained keyword on the database 230, the meta shopping mall server 200 according to an embodiment of the present disclosure may first communicate with an external server such as the store server 300 to obtain a plurality of keywords and generate keyword name information by classifying the obtained keywords into the respective categories.

Also, if a store registered on the meta shopping mall server 200 purchases a specific keyword by paying a predetermined price (for example, a predetermined amount of money), the meta shopping mall server 200 may match the purchased keyword to the corresponding store and store the keyword on the database 230 of the meta shopping mall.

At this embodiment, the meta shopping mall server 200 may derive information about a product matching the keyword that the corresponding store has purchased among products sold at the store, namely keyword product information based on the product information obtained from the corresponding store.

And the meta shopping mall server 200 may match the derived keyword product information to the corresponding keyword and the corresponding store and store the matched keyword product information on the database 230.

At this embodiment, the meta shopping mall server 200 may derive keyword product information based on 1) a tag word or 2) a product image included in each product information of a store that has purchased the corresponding keyword.

To describe in detail, first, the meta shopping mall server 200 may derive keyword product information based on 1) a tag word of product information.

More specifically, the meta shopping mall server 200 may compare a purchased keyword with a tag word preset in the product information of a plurality of products within a store that has purchased the corresponding keyword.

Also, the meta shopping mall server 200 may, from the comparison result extract at least one or more tag words, at least part of which is determined to match the keyword.

And, the meta shopping mall server 200 may determine the extracted tag word as a product included in the product information, namely, determine a product matched to the tag word as a product corresponding to the purchased keyword.

Afterwards, the meta shopping mall server 200 may generate keyword product information by integrating product information about at least one or more determined products.

Also, the meta shopping mall server 200 may derive keyword product information by using 2) deep learning based on product images of product information.

In general, a tag word may or may not be assigned to each of a plurality of products sold at a store. This is so because it may be difficult to assign a tag word to each of vast amount products in the store or because some products are not convenient to assign tag words due to difficulty in classifying them into specific categories.

Also, since there is no particular principle or rule regarding a method for assigning a tag word, tag words assigned to the respective products of the store are often determined by a subjective judgement or decision of a store operator, which causes a problem that classification criteria becomes ambiguous.

In this case, there are chances that some products are excluded in the process of extracting products corresponding to a keyword even though the products in fact correspond to the keyword that the store has purchased. For example, when the keyword is 'one-piece dress', those products whose tag word is designated as one-piece dress are extracted, but other products for which a tag word has not been assigned or a tag word different from the one-piece dress (for example, a long skirt) has been assigned may be excluded from the extraction process.

Therefore, the meta shopping mall server 200 according to an embodiment of the present disclosure may attempt to derive keyword product information by using image-based deep learning based on product images of each product of the store that has purchased a keyword.

To describe in more detail, the meta shopping mall server 200 may first obtain product images of a product provided by a specific store.

Here, the product image may be a graphic image or a photo image that captures a product.

To continue the description, the meta shopping mall server 200 which has obtained a product image may apply the obtained product image for object detection and derive a tag word for a product matching the corresponding product image.

To describe in more detail, the meta shopping mall server 200 may apply the obtained product image for object detection or detect a product object within the corresponding image from image-based deep learning through a deep learning neural network.

And, based on the detected product object, the meta shopping mall server 200 may obtain at least one or more tag words matched to the corresponding product object.

More specifically, the meta shopping mall server 200 may pre-train a deep learning neural network by using a predetermined or conventional method so as to make the neural network optimized for category classification of fashion objects and may classify a detected product object into a specific category through the trained deep learning neural network.

Here, categories to which fashion objects are classified may represent product groups to which products are classified, such as tops, bottoms, swimsuits and/or one-piece dresses.

At this time, embodiments of the present disclosure do not limit or restrict methods for training a deep learning neural network to be optimized for category classification of fashion products.

Also, based on a classified specific category, the meta shopping mall server 200 may obtain a tag word for a product matching a product image classified to the specific category.

For example, if a product image is classified to 'one-piece dress' category, the meta shopping mall server 200 may generate a designated tag word by setting 'one-piece dress' as the tag word for a product matching the corresponding product image.

And, the meta shopping mall server 200 may match the set designated tag word to the corresponding product and store the set designated tag word on the database 230.

Afterwards, the meta shopping mall server 200 may derive keyword product information based on the designated tag word regarding the corresponding product obtained by using the deep learning based on product images of a product.

To describe in detail, the meta shopping mall server 200 may compare a purchased keyword with a designated tag word obtained through the deep learning among tag words for a plurality of products at the store that has purchased the corresponding keyword.

Also, the meta shopping mall server 200 may, from the comparison result, extract at least one or more designated tag words, at least part of which is determined to match the keyword.

And, the meta shopping mall server 200 may determine the extracted designated tag word as a product included in the product information, namely, determine a product matched to the tag word as a product corresponding to the purchased keyword.

Afterwards, the meta shopping mall server 200 may generate the by integrating product information about at least one or more determined products.

As described above, the meta shopping mall server 200 may use the deep learning to detect a tag word of a product for which a predetermined tag word does not exist or derive a generalized tag word for a product and may extract, based on the detection or extraction result, a product matching a keyword that the store has purchased, thereby generating more accurate keyword product information and improve performance of a product search result service of the meta shopping mall through the keyword product information.

Afterwards, the meta shopping mall server 200 may match the derived keyword product information to the corresponding keyword and the corresponding store and store the matched keyword product information on the database 230.

Meanwhile, according to an embodiment of the present disclosure, the meta shopping mall server 200 may limit the number of stores allowed to purchase a specific keyword.

For example, the meta shopping mall server 200 may set the maximum number of stores to '3', which are allowed to purchase a first keyword and are stored and managed on the database 230 after being matched to the first keyword, and thus make a maximum of three stores receive a predetermined search preferential service based on the first keyword.

In other words, the meta shopping mall server 200 may maximize the effect of a keyword-based search preferential service by limiting the number of stores that may be matched to each keyword.

At this embodiment, a search preferential service according to an embodiment of the present disclosure may be a service that exposes stores receiving the search preferential service and at least one or more products matched to the keyword that the stores have purchased together through an upper interface exposed at the top of a result screen when a user performs a product search. Detailed descriptions of this service will be given later.

Also, the meta shopping mall server 200 according to an embodiment of the present disclosure may generate and store an index document.

Here, the index document may be a document that arranges items forming a basis for performing a store, product and/or keyword-based product search based on store information, product information, and keyword comprehensive information about a plurality of stores, and manages the arranged items in the form of a list.

To describe in more detail, the meta shopping mall server 200 may generate 1) a store index document based on store information, 2) a product index document based on product information and/or 3) a keyword index document based on keyword comprehensive information for each of a plurality of stores registered on the meta shopping mall server 200.

For example, the meta shopping mall server 200 may generate 1) a store name list index document about stores on the meta shopping mall, the store name list index document being generated based on the store names of store information, 2) a product name list index document about products provided by the stores on the meta shopping mall, the product name list index document being generated based on the product names of product information and/or 3) a keyword index document implementing keyword names obtained from an external server or generated internally as a list, the keyword names being generated based on the keyword comprehensive information.

And the meta shopping mall server 200 may store and manage individual index documents generated for a plurality of stores on the database 230.

Through the operations above, the meta shopping mall server 200 may derive a product search result more efficiently and quickly by performing an index document-based product search based on search words obtained afterwards.

Figure 5:
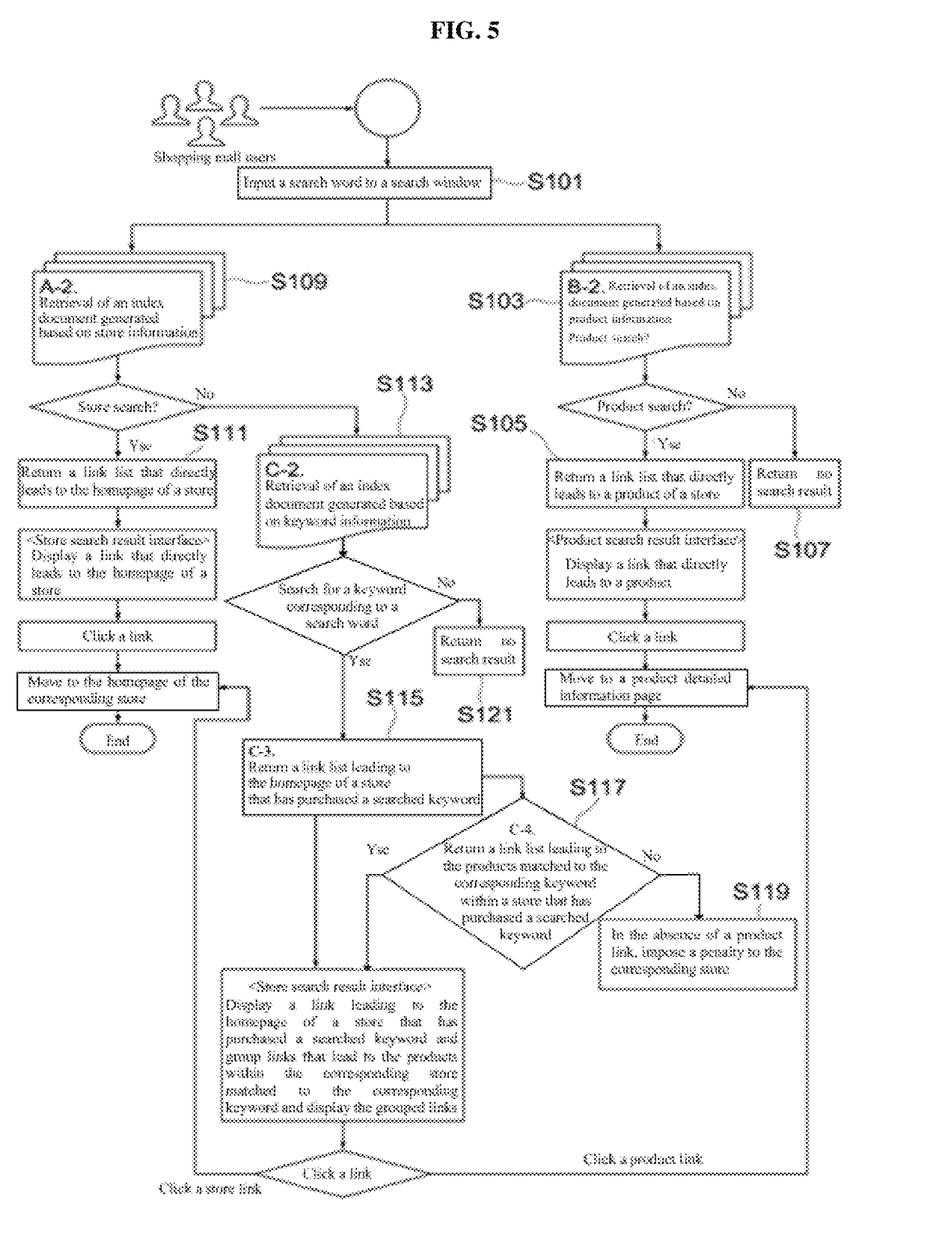
FIG. 5 is a flow diagram illustrating a method for providing a product search result of a meta shopping mall according to an embodiment of the present disclosure.

FIG. 5 is a flow diagram illustrating a method for providing a product search result of a meta shopping mall according to an embodiment of the present disclosure.

Meanwhile, referring to FIG. 5, the meta shopping mall server 200 that has built the meta shopping mall database 230 may first obtain a search word input to perform a product search result provision service of the meta shopping mall (S101).

Here, a search word may be a term input on a shopping mall web for the purpose of product search, which may include a product name search word such as "one-piece dress" or "jeans".

Also, the search word may be a term input on a shopping mall web for the purpose of product search, which may include a store name search word such as a name of a store on an online shopping mall.

To describe in detail, in conjunction with an application providing a meta shopping mall service installed in the user terminal 100, the meta shopping mall server 200 may obtain a search word input on the meta shopping mall for the purpose of product search.

Next, the meta shopping mall server 200 may retrieve an index document based on an obtained search word.

To described in detail, the meta shopping mall server 200 according to an embodiment of the present disclosure may perform search word-based index document retrieval sequentially by using 1) an index document based on store information, 2) an index document based on product information and/or 3) an index document based on keyword comprehensive information.

First, the meta shopping mall server 200 may search for a product corresponding to a search word by retrieving 1) a product information-based index document based on the search word (S103).

According to an embodiment, the meta shopping mall server 200 may compare an obtained search word with a product name list index document generated based on product names of products provided by a plurality of stores on the meta shopping mall.

And, the meta shopping mall server 200 may check, from the comparison result, existence of a product, at least part of the product name of which is deemed to match the search word.

At this time, in the existence of at least one or more products corresponding to the search word, the meta shopping mall server 200 may return a product link list that directly leads to the corresponding products.

Here, the product link list may be generated based on the product information of a matching product and the product link list according to an embodiment may include a product name, a product sales store name, a product page link address, a product price and/or a product image of the product.

To describe in detail, the meta shopping mall server 200 may return a product link list for at least one or more products detected in correspondence with the search word through a product search result output interface (S105).

Here, the product search result output interface may be an interface for displaying, in a batch fashion, the product link list for one or more products detected based on the search word as a graphic image, which may be provided through an application installed in the user terminal 100. Through the output interface, a user may use or operate an input and output interface such as checking a product searched on the web or on the application and moving to a web page for the purchase of the product.

For example, the product search result output interface according to an embodiment of the present disclosure may be located below a store search result output interface to be described later. In other words, the product search result output interface may be provided at a location below the store search result output interface on a screen displayed through the display 120 of the user terminal 100. Detailed descriptions of the above feature will be given later.

Figure 6:
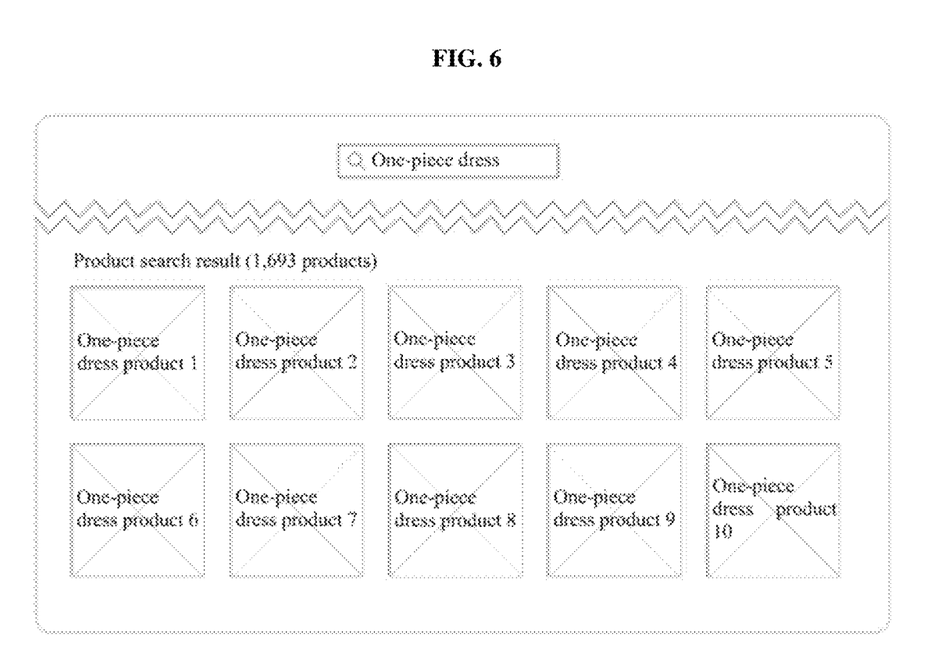
FIG. 6 is an example of a product search result output interface according to an embodiment of the present disclosure.

In other words, the meta shopping mall server 200 may detect one or more products corresponding to a search word based on a product information-based index document, derive a product link list for at least one or more detected products, and provide the derived product link list through a product search result output interface as shown in FIG. 6.

Afterwards, if the meta shopping mall server 200 obtains an input for a product page link address of the product link list provided through the product search result output interface, the meta shopping mall server 200 may perform or provide a process to move to a web page containing detailed information of the corresponding product (for example, a web page showing the corresponding product posted by a store providing the corresponding product).

Meanwhile, in the absence of a product corresponding to the search word, the meta shopping mall server 200 may indicate absence of a search result through the product search result output interface (S107).

For example, the meta shopping mall server 200 may provide a product search result output interface that displays 'no search result' as text when a product corresponding to the search word is not searched or detected.

Next, the meta shopping mall server 200 may search for a store corresponding to a search word by retrieving 2) a store information-based index document based on the search word (S109).

According to an embodiment, the meta shopping mall server 200 may compare an obtained search word with a store name list index document generated based on the store names of a plurality of stores on the meta shopping mall.

And, the meta shopping mall server 200 may check, from the comparison result, existence of a store, at least part of the store name of which is deemed to match the search word.

At this time, in the existence of at least one or more stores corresponding to the search word, the meta shopping mall server 200 may return a store link list that directly leads to the corresponding stores.

Here, the store link list may be generated based on the store information of stores and include store names and/or store homepage link addresses.

To describe in detail, the meta shopping mall server 200 may return a store link list for at least one or more stores detected in correspondence with the search word through a store search result output interface (S111).

Here, the store search result output interface may be an interface for displaying, in a batch fashion, the store link list for one or more stores searched or detected based on the search word as a graphic image, which may be provided through an application installed in the user terminal 100.

At this time, the store search result output interface according to an embodiment of the present disclosure may be located above the product search result output interface. In other words, the store search result output interface may be provided by being displayed above the product search result output interface on a screen displayed by the display 120 of the user terminal 100.

Figure 7:
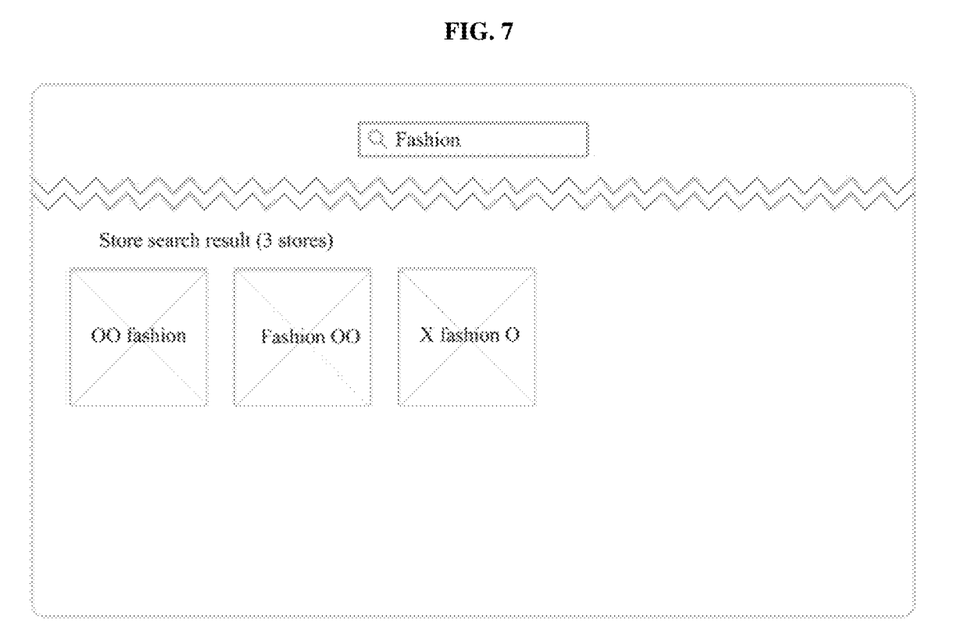
FIG. 7 is an example of a store search result output interface according to an embodiment of the present disclosure.

In other words, the meta shopping mall server 200 may detect one or more stores corresponding to a search word based on a store information-based index document, derive a store link list for one or more detected stores, and provide the derived store link list through the store search result output interface as shown in FIG. 7.

In addition, for a specific store that has purchased a keyword to be described later, the meta shopping mall server 200 according to an embodiment may group a store link list of stores that have purchased the corresponding keyword and a product link list of at least one or more products matched to the corresponding keyword of the specific store and provide the grouped lists together through the store search result output interface. Detailed descriptions of the above feature will be given later.

Afterwards, if the meta shopping mall server 200 obtains an input for a store homepage link address of the store link list or a product page link address of the product link list provided through the store search result output interface, the meta shopping mall server 200 may perform or provide a process to move to a web homepage of the corresponding store or a web page containing detailed information of the corresponding product (for example, a web page showing the corresponding product posted by a store providing the corresponding product).

Next, in the absence of a store corresponding to a keyword, the meta shopping mall server 200 may search for a store and/or a product corresponding to the search word by retrieving 3) a keyword comprehensive information-based index document based on the search word (S113).

To describe in detail, the meta shopping mall server 200 may first retrieve a keyword comprehensive information-based index document by using the search word and detect a keyword corresponding to the search word.

According to an embodiment, the meta shopping mall server 200 may compare an obtained search word with an index document implementing keyword names stored on the database 230 of the meta shopping mall server 200 as a list.

And, the meta shopping mall server 200 may check, from the comparison result, existence of a keyword, at least part of the keyword name of which is deemed to match the search word.

Here, in the existence of at least one or more keywords corresponding to the search word, the meta shopping mall server 200 may determine relevance of a product corresponding to the keyword and return a store link list that directly leads to a store which has purchased the corresponding keyword and a list of one or more product links that directly lead to the products matched to the corresponding keyword within the corresponding store through the store search result output interface (S115, S117).

In other words, when searching for a store and/or a product matched to the corresponding search word by retrieving a keyword comprehensive information-based index document, the meta shopping mall server 200 according to an embodiment of the present disclosure may derive a keyword matched to the corresponding search word as a result of the corresponding search, determine relevance of the product matched to the corresponding keyword, and group the store link list of stores that have purchased the corresponding keyword and the product link list for one or more products matched to the corresponding store and the corresponding keyword.

At this time, the meta shopping mall server 200 may utilize the keyword comprehensive information prestored on the database 230 to obtain a product link list for at least one or more products matched to the corresponding store and the corresponding keyword.

To describe in detail, the meta shopping mall server 200 may extract one or more products matched to the corresponding keyword among the products sold at the corresponding store based on the keyword name prestored as keyword comprehensive information, keyword purchase information for each store, penalty information for each store, keyword expiration date information for each store and/or keyword product information for each store. In other words, the meta shopping mall server 200 may store a tag word matched to a keyword for each store and information about a tag word matching product as the keyword comprehensive information in advance, quickly extract product information related to the keyword matching tag word within the store without separately accessing the store server 300 at the time of keyword search, and provide the extracted product information to the user terminal 100.

And, the meta shopping mall server 200 may obtain a product link list for one or more extracted products and group the product link list and the store link list of the corresponding store.

Also, the meta shopping mall server 200 may provide the grouped store link list and product link list through the store search result output interface (namely, an interface located above a product search result output interface on a screen displayed on the user terminal 100).

Figure 8:
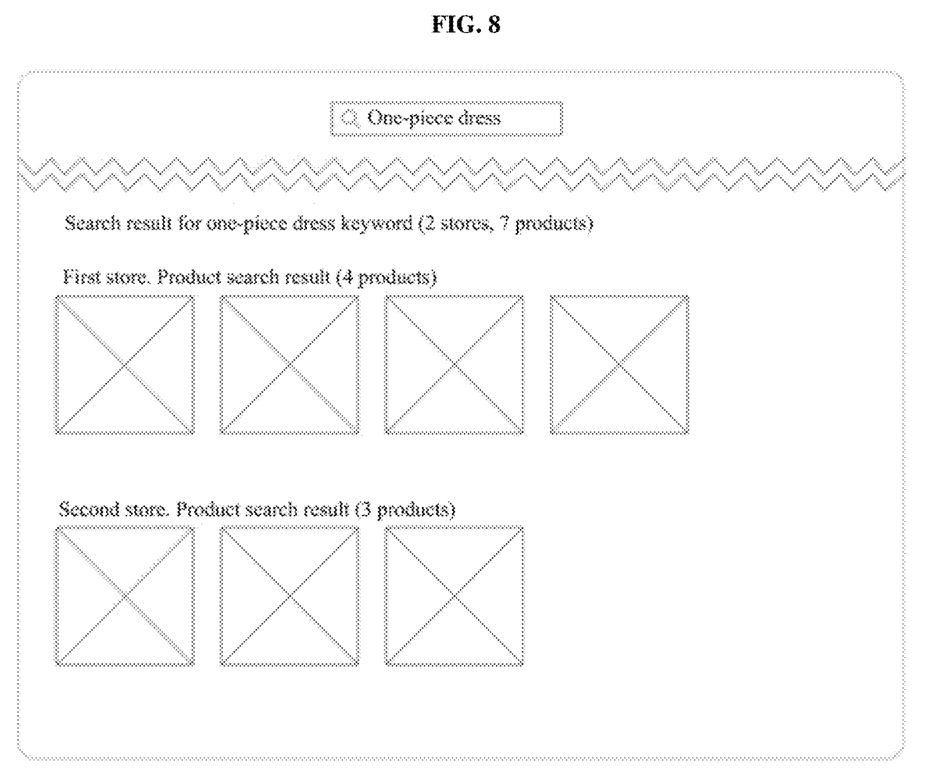
FIG. 8 is an example of a store search result output interface displaying a product search result based on a keyword according to an embodiment of the present disclosure.

In an embodiment, the meta shopping mall server 200 may group a store link list for stores that have purchased a searched keyword and a product link list for one or more products matched to the corresponding store and the corresponding keyword and provide the grouped lists through the store search result output interface as shown in FIG. 8.

To described in detail, for example, when a first store purchases keyword 'one-piece dress' and then a search is performed with a search word 'one-piece dress', the meta shopping mall server 200 may detect the first store that has purchased the keyword, one-piece dress, corresponding to the search word, one-piece dress, from the keyword name index document.

And, the meta shopping mall server 200 may obtain a store link list (including a store name and/or a store homepage link address) based on the store information of the detected first store; search the database 230 for a product link list (including a product name, a product sales store name, a product page link address, a product price and/or a product image for each product) about at one or more products corresponding to the keyword, one-piece dress, based on the product information (for example, a tag word) of the detected first store; and obtain the product link list from the database 230.

In other words, the meta shopping mall server 200 may utilize keyword comprehensive information prestored on the database 230 to obtain a product link list for one or more products corresponding to the keyword, 'one-piece dress', from a plurality of products sold at the detected first store.

To describe in detail, the meta shopping mall server 200 may extract one or more products matched to the keyword 'one-piece dress' among the products sold at the first store based on the keyword name prestored as keyword comprehensive information, keyword purchase information for each store, penalty information for each store, keyword expiration date information for each store and/or keyword product information for each store.

For example, the meta shopping mall server 200 may obtain product information about one or more products corresponding to the keyword 'one-piece dress' purchased by the first store from a plurality of products sold at the first store through the keyword product information for each store and obtain a product link list based on the obtained product information.

And, the meta shopping mall server 200 may group the obtained store link list and product link list and display the grouped lists through the store search result output interface.

As described above, by performing search using a search word based on a keyword comprehensive information-based index document, grouping, from the search result, a store link list for stores that have purchased a keyword matched to the corresponding search word and a product link list for one or more products matched to the corresponding keyword and the corresponding store, and providing the grouped lists through a store search result output interface located on an upper part of the screen of the user terminal 100, the meta shopping mall server 200 may efficiently maximize the exposure effect for a store that has purchased the keyword and products of the corresponding store, increase a keyword purchase rate of the stores wanting to benefit from the exposure effect, and thus increase profits through the meta shopping mall service.

Afterwards, if the meta shopping mall server 200 obtains an input for selecting a store homepage link address of the store link list or a product page link address of the product link list provided through the store search result output interface, the meta shopping mall server 200 may perform or provide a process to move to a web homepage of the corresponding store or a web page containing detailed information of the corresponding product (for example, a web page showing the corresponding product posted by a store providing the corresponding product).

Meanwhile, depending on the situations, even though a store has already purchased a specific keyword, at least one or more products matched to the specific keyword may not exist in the store due to an insufficient stock or discontinuation of the products. In this case, even though the store searched through the store search result output interface may be exposed, quality of the product search may be degraded due to absence of available products.

Therefore, when a store that has purchased a searched keyword is searched or detected but a product link list for one or more products does not exist, which leads to the product matched to the corresponding keyword within the store that has purchased the corresponding keyword, that is, when the relevance of the product corresponding to the keyword is determined but a product link list corresponding to the keyword is not obtained, the meta shopping mall server 200 according to an embodiment of the present disclosure may impose a predetermined penalty on the corresponding store (S119).

In other words, when a store purchases the corresponding keyword but there is no keyword product information matched to the corresponding store and stored on the database 230, the meta shopping mall 200 may impose a predetermined penalty on the corresponding store.

At this time, the meta shopping mall server 200 according to an embodiment may impose a predetermined penalty in various ways such as restriction on repurchase of the corresponding keyword and/or shortening the valid period for the corresponding keyword. However, embodiments of the present disclosure do not restrict or limit the specific method for imposing a penalty.

As described above, by imposing a predetermined penalty on a store that has purchased a keyword but does not provide the corresponding product, the meta shopping mall server 200 may improve the reliability and quality of the product search result provision service of the meta shopping mall.

Meanwhile, in the absence of a keyword corresponding to a search word, the meta shopping mall server 200 may indicate the absence of a search result through the store search result output interface (S121).

For example, the meta shopping mall server 200 may provide a store search result output interface that displays 'no search result' as text when a keyword corresponding to the search word is not detected.

As described above, a method for providing a product search result of a meta shopping mall according to an embodiment of the present disclosure may search a product in various ways based on a multi-faceted process, thereby providing an effect of improving performance and quality of product search through the meta shopping mall.

Also, a method for providing a product search result of a meta shopping mall according to an embodiment of the present disclosure may implement an interface providing a product search result in a systematic manner, thereby exposing a vast amount of search result information in an efficient manner and maximizing exposure effect of a store or a product.

Also, a method for providing a product search result of a meta shopping mall according to an embodiment of the present disclosure may provide a store that has paid a predetermined price with a search preferential service corresponding to the paid amount, thereby increasing profits through meta shopping services.

Also, some embodiments of the present disclosure may be implemented in the form of program commands or instructions which may be executed through various constituting elements of computer means and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; magneto-optical media such as floptical disks, and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be configured to be operated by one or more software modules to perform the operations of the present disclosure, and vice versa.

Specific implementation of the present disclosure are embodiments, which does not limit the technical scope of the present disclosure in any other way. For the clarity of the disclosure, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the content provided in the detailed descriptions of this document but has to be defined by the appended claims.

A method for providing a product search result of a meta shopping mall according to an embodiment of the present disclosure may search one or more products in various ways based on a multi-faceted process, thereby providing an effect of improving performance and quality of product search through the meta shopping mall.

Also, a method for providing a product search result of a meta shopping mall according to an embodiment of the present disclosure may implement an interface providing a product search result in a systematic manner, thereby exposing a vast amount of search result information in an efficient manner and maximizing the exposure effect of a store or a product.

Additionally, a method for providing a product search result of a meta shopping mall according to an embodiment of the present disclosure may provide a store (online shopping mall) that has paid a predetermined price with a search preferential service corresponding to the paid amount, thereby increasing profits through meta shopping services.

However, those effects that may be obtained from the present disclosure are not limited to the effects described above, and other effects not mentioned in the present disclosure may be clearly understood from the descriptions given below.

What is claimed is:

1. A method for providing a product search result of a meta shopping mall providing, by a processor of a meta shopping mall server, information associated with a plurality of stores registered on the meta shopping mall and products of the plurality of stores, the method comprising:
   constructing a database by receiving store information of the plurality of stores and product information of the products of the stores from servers associated with the stores;
   receiving the store information of the stores from the servers associated with the stores, generating a store index document including search words corresponding to the stores for searching for each of the stores, and storing the generated index document on the database;
   receiving the product information of the products of the stores from the servers associated with the stores, generating a product index document including search words corresponding to the products of the stores for searching for each of the products of the stores, and storing the generated product index document on the database;
   generating keyword comprehensive information about one or more of the stores which register one or more keywords, generating a keyword index document including the one or more keywords registered to the one or more of the stores, and storing the generated keyword index document on the database;
   receiving, by a user terminal, a search word input from a user; and
   searching the keyword index document, stored on the database, for the received search word to find one or more keywords corresponding to the received search word and providing the user terminal with an interface for outputting a store search result for one or more products corresponding to the found one or more keywords corresponding to the received search word.

2. The method of claim 1, further comprising:
   searching the product index document for the received search word to find one or more products corresponding to the received search word; and
   providing an interface for outputting a product search result for the found one or more products to the user terminal.

3. The method of claim 1, further comprising: searching the store index document for the received search word to find one or more stores corresponding to the received search word,
   providing the interface for outputting the store search result for the found one or more stores to the user terminal.

4. The method of claim 3, wherein the providing the user terminal with the interface for outputting the store search result for the one or more products corresponding to the found one or more keywords includes:
   if no store corresponding to the received search word is found from the store index documents, searching the keyword index document for the received search word to find one or more stores corresponding to the search word; and
   providing the interface for outputting the store search result for the one or more products of the one or more of the stores, which register the one or more keywords, corresponding to the found one or more keywords which are searched from the keyword comprehensive information based on the received search word.

5. The method of claim 1, wherein the store information of each of the stores includes a store name and a store homepage link address; and
   the product information of each of the products includes a product name, a product sales store name, a product page link address, a product tag word, a product price, a product image for each product, and at least one or more of product description, product sales volume, and product review information.

6. The method of claim 5, wherein the keyword comprehensive information includes one or more of a keyword term for each of the stores, keyword purchase information for each of the stores, penalty information for each of the stores, information on a keyword expiration date for each of the stores, and keyword product information for each of the stores.

7. The method of claim 6, wherein the generating of the keyword comprehensive information comprises obtaining the keyword product information by performing deep learning based on the product image included in the product information of the each of the products sold in the stores.

8. The method of claim 7, further comprising:
   comparing the one or more keywords, registered to the one or more of the stores, with a designated tag word obtained by performing the deep learning based on the product image included in the product information of the each of the products sold in the stores; and
   if at least part of the designated tag word matches the one or more keywords, registered to the one or more of the stores, including the product information corresponding to the designated tag word in the keyword product information.

9. The method of claim 4, wherein the providing of the interface for outputting the store search result for the found one or more stores includes extracting the store information corresponding to the received search word from the store index document and returning a store link list based on the extracted store information, and
   wherein the providing of the interface for outputting the store search result for the one or more products of the one or more of the stores, which register the one or more keywords, corresponding to the found one or more keywords which are searched from the keyword comprehensive information based on the received word includes:

extracting one or more of the stores corresponding to the received search word from the keyword index document, extracting keyword product information corresponding to the found one or more keywords among products of the extracted one or more of the stores, and providing the store link list and a product link list by generating and grouping the store link list and the product link list based on the extracted keyword product information.

10. The method of claim 9, wherein:

the store link list includes a store name and a store homepage link address that leads to a store homepage on a web; and the product link list includes a product name, a product sales store name, a product page link address that leads to a webpage containing detailed product information, a product price, and a product image.

11. The method of claim 9, further comprising imposing a predetermined penalty on a store in absence of the product link list among the plurality of the stores.

12. The method of claim 9, wherein:

the interface for outputting the store search result is an interface displaying in a batch fashion the store link list of the stores found based on the received search word as a graphic image, and the interface for outputting the product search result is an interface displaying in a batch fashion the product link list of the products found based on the received search word as a graphic image.

13. The method of claim 9, wherein the interface for outputting the store search result and/or the interface for outputting the product search result output the store search result and/or the product search result on a screen of the user terminal displaying the interface for outputting the store search result and/or the interface for outputting the product search result such that the interface for outputting the store search result is placed above the interface for outputting the product search result.

14. A system for providing a product search result of a meta shopping mall providing information associated with a plurality of stores registered on the meta shopping mall and products of the plurality of stores by a processor of a meta shopping mall server, the system comprising:

at least one processor; and at least one memory storing executable instructions that, if executed by the at least one processor, configure the at least one processor to:

construct a database by receiving store information of the plurality of stores and product information of the products of the stores from servers associated with the stores;

receive the store information of the stores from the servers associated with the stores, generates a store index document including search words corresponding to the stores for searching for each of the stores, and stores the generated index document on the database;

receive the product information of the products of the stores from the servers of the stores, generate a product index document including search words corresponding to the products of the stores for searching for each of the products of the stores, and store the generated product index document on the database;

generate keyword comprehensive information about one or more of the stores which register one or more keywords, generate a keyword index document including the one or more keywords registered to the one or more of the stores, and store the generated keyword index document on the database;

receive a search word input from a user; and search the keyword index document, stored on the database, for the received search word to find one or more keywords corresponding to the received search word and provide a user terminal with an interface for outputting a store search result for one or more products corresponding to the found one or more keywords corresponding to the received search word.

\* \* \* \* \*